United States Patent [19]
Kubek

[11] 3,768,758
[45] Oct. 30, 1973

[54] LANDING GEAR STRUT-TO-SKI BALL SOCKET CONNECTION

[75] Inventor: John Kubek, Anchorage, Alaska

[73] Assignee: Maxweldon Sides, Anchorage, Alaska ; a part interest

[22] Filed: Jan. 28, 1972

[21] Appl. No.: 221,525

[52] U.S. Cl. .................................. 244/108, 280/25
[51] Int. Cl. .......................................... B64c 25/52
[58] Field of Search.................... 244/108, 105, 101, 244/100 R; 280/14, 26, 28, 7.14, 25; 287/88, 87

[56] References Cited
UNITED STATES PATENTS

| | | | |
|---|---|---|---|
| 2,950,883 | 8/1960 | Landes | 244/108 |
| 3,030,123 | 4/1962 | Dworak | 280/26 |
| 3,176,805 | 4/1965 | Gandy | 287/87 X |

Primary Examiner—Milton Buchler
Assistant Examiner—Paul E. Sauberer
Attorney—Harvey B. Jacobson

[57] ABSTRACT

An articulate connection for attaching a snow ski to the landing strut of an airplane and including structural features whereby the associated ski may not only oscillate about a horizontal transverse axis relative to the strut but also oscillate, in a limited manner, about an axis generally paralleling the ski.

2 Claims, 6 Drawing Figures

Patented Oct. 30, 1973
3,768,758
2 Sheets-Sheet 1
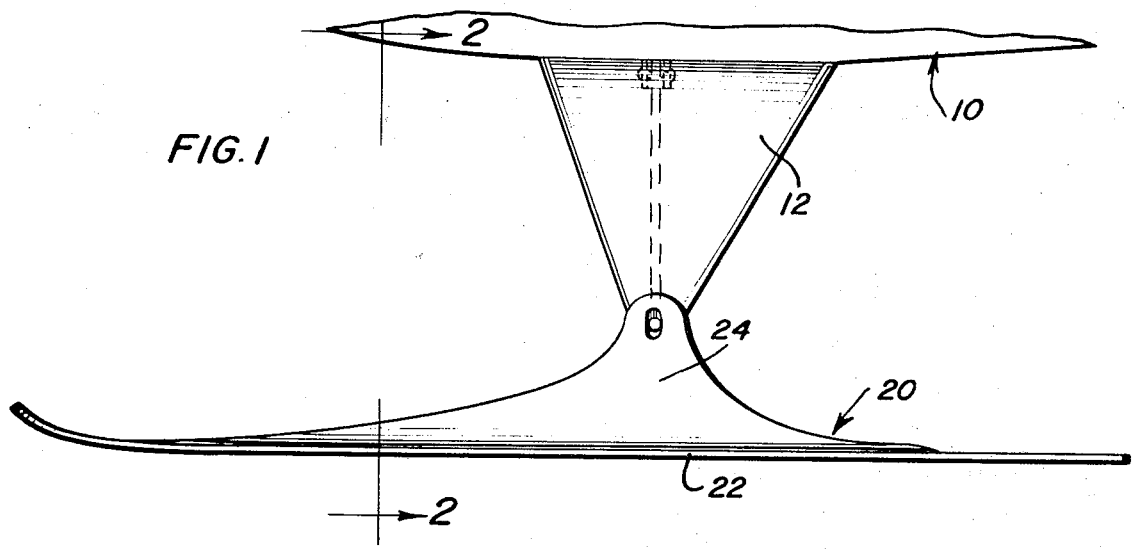
FIG. 1
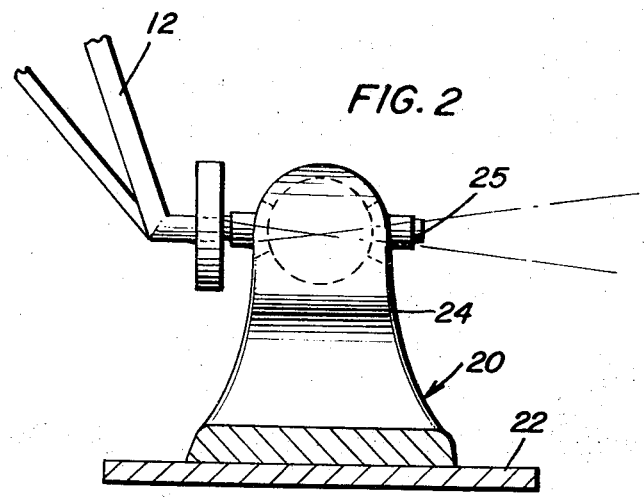
FIG. 2
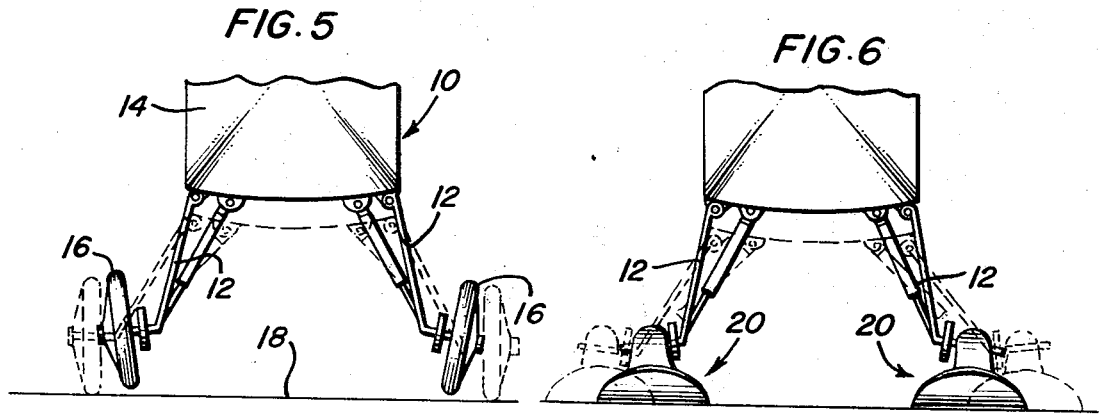
FIG. 5
FIG. 6

LANDING GEAR STRUT-TO-SKI BALL SOCKET CONNECTION

Light aircraft are provided, in most instances, with downwardly and outwardly divergent wheel supporting struts when the aircraft does not include retractable landing gear. This type of fixed landing gear is resilient, at least to some degree, and the lower ends of the landing struts from which the landing wheels are journaled to splay outwardly upon impact of the aircraft with the ground during landing operations. As long as such lightweight aircraft provided with fixed landing gear are also equipped with landing wheels and not skis, no difficulty is encountered inasmuch as the wheels may roll along the ground in cambered positions and still absorb appreciable shock due to their resiliency. However, when light aircraft including fixed landing gear have snow skis mounted on their landing struts in lieu of wheels, if the skis are positioned so as to be horizontal when the struts are unladen while the aircraft is in the air in order to enable the skis to be in non-cambered positions upon initial contact of the skis with the ground, the inherent outward splaying of the lower ends of the landing struts from which the skis are supported results in the skis being positively cambered so that the maximum shock of landing is carried by the inside edges of the skis. Inasmuch as the skis are not resilient to the extent of conventional landing wheels and the maximum landing shock is centered along the inside edges of the skis, the latter are often over stressed to the point of failure. While the possibility of ski failure could be at least partially reduced by the utilization of more heavily constructed skis, the substitution of skis on light aircraft in lieu of landing wheels loads the aircraft more heavily and the utilization of even more heavily constructed skis would further load the aircraft and reduce its performance both in the air and while taking off.

It is accordingly the main object of this invention to provide a means whereby landing skis for light aircraft provided with fixed landing gear of the type embodying downwardly and outwardly inclined struts may be supported from those struts for limited oscillation about axes generally paralleling the skis. In this manner, and with the skis hung in pendulum fashion from the lower ends of the struts, the under surfaces of the skis may be maintained parallel with the ground even during flexing in the form of outward splaying of the lower ends of the landing struts from which the skis are supported.

Another object of this invention, in accordance with the immediately preceding object, is to provide an articulated joint between the landing struts of aircraft and snow skis supported therefrom which will enable the skis to be quickly mounted upon those spindle portions carried by the lower ends of the struts from which conventional landing wheels are usually journaled.

Yet another object of this invention is to provide a strut-to-ski connection enabling snow skis to be readily mounted upon substantially all lightweight aircraft conventionally provided with landing wheels.

A final object of this invention to be specifically enumerated herein is to provide a strut-to-ski connection for light aircraft which will conform to conventional forms of manufacture, be of simple construction and easy to install so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 1 is a fragmentary side elevational view of the lower forward fuselage portion of a lightweight aircraft illustrating a snow ski supported from the near side landing strut of the aircraft by means of the improved strut-to-ski connection of the instant invention;

FIG. 2 is a fragmentary transverse vertical sectional view taken substantially upon the plane indicated by the section line 2—2 of FIG. 1 and on somewhat of an enlarged scale;

Figure 3:
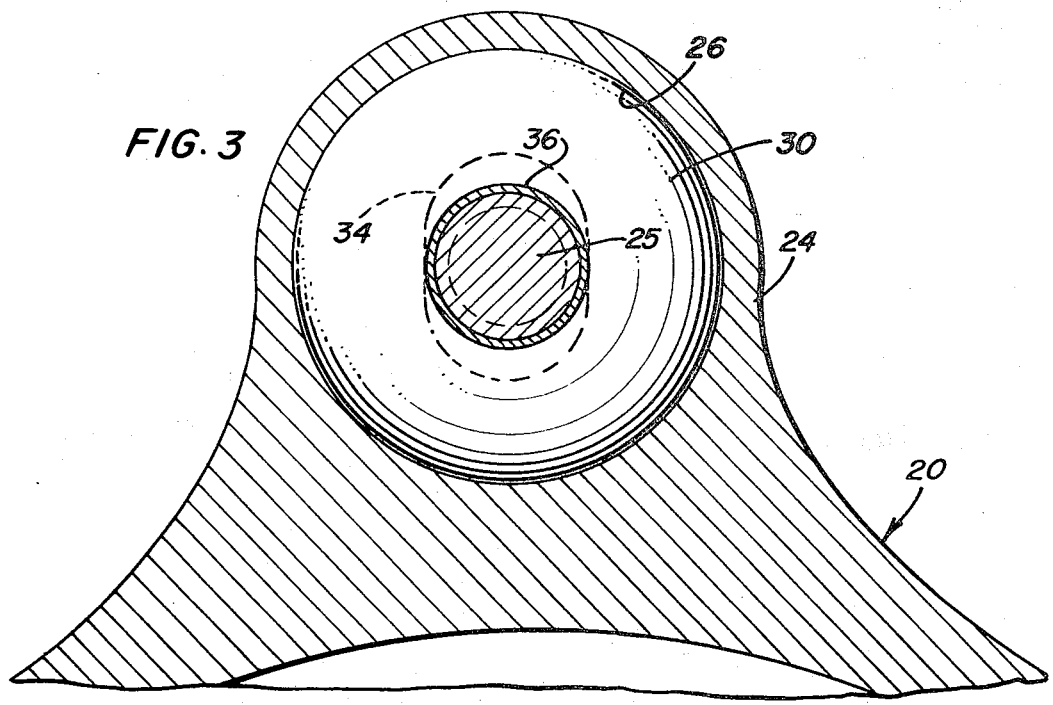
FIG. 3 is a fragmentary longitudinal vertical sectional view taken substantially upon the plane passing through the center of the strut-to-ski connection.

FIG. 5 is a fragmentary front elevational view of a conventional form of light aircraft provided with fixed landing gear and illustrating the manner in which the wheels of the aircraft splay outwardly upon impact of the aircraft landing wheels with the ground, FIG. 5 clearly illustrating the change in camber as the aircraft lands; and FIG. 6 is a fragmentary elevational view similar to FIG. 5 but illustrating the manner in which the strut-to-ski connection of the instant invention enables the associated snow skis to obtain their horizontal positions so as to prevent the inside edges of the skis from being overly stressed.

Referring now more specifically to the drawings the numeral 10 generally designates a conventional lightweight aircraft including downwardly and outwardly divergent landing gear struts 12 hung from the underside of the fuselage 14 of the plane or aircraft 10 in any conventional manner. As may be seen from FIG. 5 of the drawings the lower ends of the struts 12 conventionally have landing wheels 16 journaled therefrom and the struts 12 assume a position, when unloaded, supporting the wheels 16 in downwardly convergent positions. However, as may be noted from the phantom line illustration in FIG. 5, as the aircraft 10 impacts with the ground 18 the lower ends of the struts 12 are splayed outward so that when maximum loading of the struts occurs the wheels 16 will be disposed in substantially upright position.

Initially, if snow skis were to be supported from the struts 12 in a manner such that the skis were cambered in the inclined positions of the wheels 16 illustrated in solid lines in FIG. 5 of the drawings, when the aircraft 10 lands the outside edges of the skis would have a tendency to cut into the snow covered ground upon which the aircraft is landing and if there was any cross wind the lateral movement of the aircraft at the instant of impact with the ground in conjunction with the cambered ski on the downwind side of the aircraft would tend to cause the downwind ski to dig into the ground in a manner such that the downwind wing tip might contact the ground and cause the aircraft to ground loop. On the other hand, if skis were mounted on the lower ends of the struts 12 in their unloaded condition with the skis horizontally disposed, the outward splaying of the lower ends of the struts upon contact of the aircraft with the ground will cause the maximum loading of the aircraft on the skis to be carried by the inside edgess of the skis. Therefore, the strut-to-ski connection of the instant invention has been designed to enable the skis carried by the fixed landing struts of the light aircraft to oscillate slightly about their longitudinal axes thus allowing the undersurfaces of the skis to parallel to the ground at all times.

In FIGS. 1–4 and 6 of the drawings the aircraft 10 is provided with snow skis referred to in general by the reference numerals 20 and the skis 20 include ski members 22 and central upwardly projecting body portions 24 by which the skis 20 are supported from the lower ends of the struts 12.

Conventionally, the struts 12 include laterally outwardly projecting and generally horizontal spindle portions 25 from which wheels such as the wheels 16 in FIG. 5 are journaled. In order to facilitate ready replacement of such wheels 16 with the skis 20, the skis 20 are constructed in a manner whereby they may be oscillatably supported from the same stub axles 25.

Figure 4:
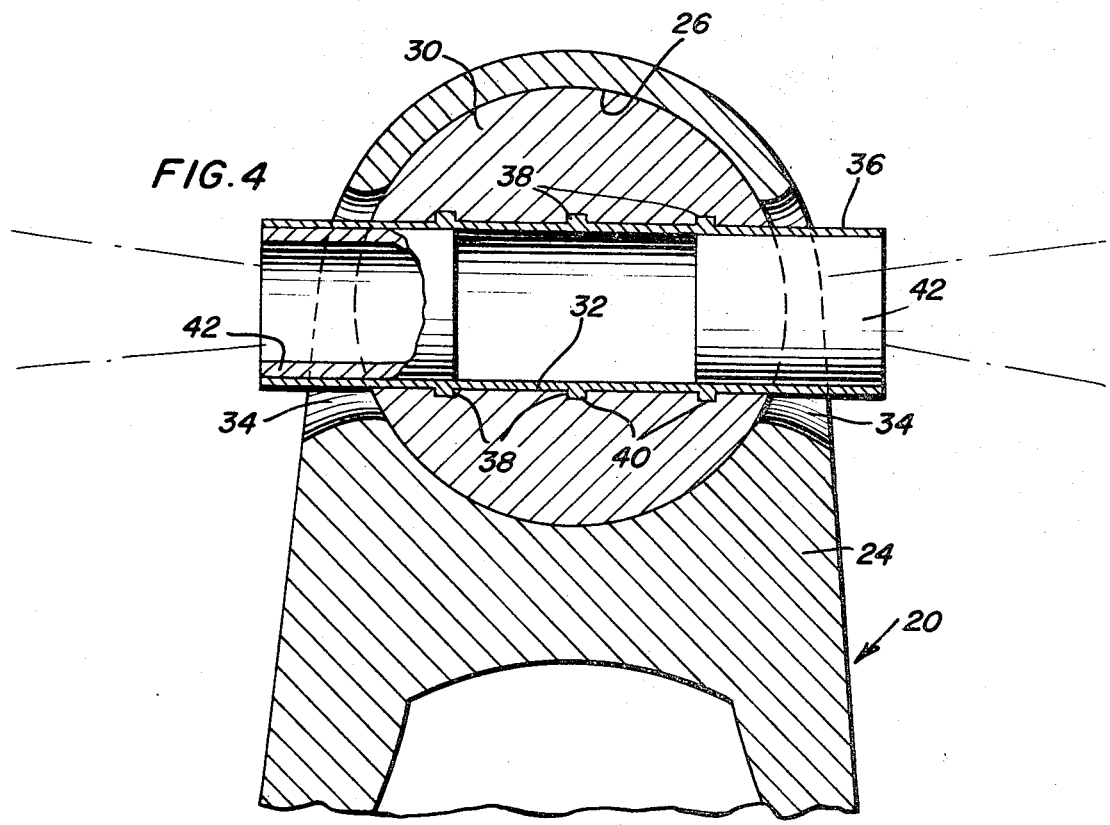
FIG. 4 is an enlarged fragmentary transverse vertical sectional view taken substantially upon the plane passing through the center of the strut-to-ski connection.

With attention now invited more specifically to FIG. 4 of the drawings it may be seen that the upper portion of the body portion 24 has a spherical socket 26 molded therein. Within the socket 26 is disposed a spherical ball 30 and the ball 30 is provided with a diametric bore 32 whose opposite ends are registered with vertically elongated slots 34 formed in the opposite sides of the body 24. The slots 34 are disposed diametrically opposite each other in relation to the socket 26 and a cylindrical sleeve 36 is secured through the bore 32. The bore 32 includes axially spaced circumferential grooves 38 in which circumferential ribs 40 formed on the sleeve 36 are seated. Finally, bearing sleeves 42 are secured within the opposite ends of the sleeve 36 in axially spaced relation. Initially, the ball 30 may be molded and the body 24 molded about the ball. Thereafter, the sleeve 36 may be inserted or molded within ball 30 and the sleeves 42 may be thereafter inserted into and bonded in place within the opposite ends of the sleeve 36. Then, each ski 20 may be journaled on the corresponding stub axle 25 with any suitable means being utilized to retain the sleeves 42 against axial shifting relative to the stub shafts 25.

From FIG. 4 of the drawings it may be seen that the skis 20 may thus be oscillated about axes generally paralleling the ski members 22 and extending through the center of the ball 30. By this construction, the change in camber of the struts 12 did not affect the camber of the skis 20 and the under surfaces of the ski members 22 thereof may always parallel the ground surface upon which the aircraft is landing or from which the aircraft 10 is departing. The center of gravity of the skis 20 is, of course, disposed below the elevation of the center of the balls 30 and thus, the skis 20 tend to naturally assume horizontally positions by gravity. In this manner, the skis are substantially horizontally disposed upon initial contact with the ground and also horizontally disposed when the struts 12 are loaded to their maximum during landing operations.

The materials of which the various components of the skis 20 may be formed are numerous. Plastics as well as certain metals may be used and the ball and socket connection defined by the ball 30 and socket 26 provides sufficient strength to support the skis 20 from the lower ends of the struts 12. If it is desired, the upper portion of the body portion 24 in which the socket 26 is formed can be constructed as a separate part and secured to the lower portion of the body portion 24 in any convenient manner enabling the ball and socket connection defined by the upper body portion to be readily replaced, when desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a light aircraft having a downwardly and laterally outwardly inclined landing strut of the type including an axle end upon which a landing wheel may be journaled, a spherical ball member having a diametric sleeve secured therethrough and journaled on said axle end for rotation about the longitudinal axis of said axle end and a diameter of said ball member, an elongated horizontal ski member having a central upwardly projecting body portion, an upper portion of said body portion having a spherical cavity formed therein in which said ball member is captively received with said axle end portion extending horizontally and transverse to said ski, the opposite ends of said sleeve projecting outwardly of opposite sides of said ball member, said upper portion of said body having upstanding slots formed therein on opposite sides of and opening into said cavity and through which the opposite ends of said sleeve project and in which said sleeve ends are slidably guidingly received for limiting oscillation of said ski member relative to said ball member to angular displacement about a horizontal axis passing along a diameter of said ball member and generally paralleling said ski, said sleeve ends having bearing sleeve means secured therein through which said axle end portion is journaled.

2. The combination of claim 1 wherein said sleeve and ball member include coacting means locking said sleeve within said ball member against axial shifting of said sleeve relative to said ball member.

* * * * *